US012202382B2

(12) United States Patent
Balde

(10) Patent No.: US 12,202,382 B2
(45) Date of Patent: Jan. 21, 2025

(54) OCCUPANCY SENSING DEVICE, OCCUPANCY SENSING AND HEATING MAT, AND VEHICLE SEAT

(71) Applicant: FAURECIA Sièges d'Automobile, Nanterre (FR)

(72) Inventor: Mamadou Balde, Morigny-Champigny (FR)

(73) Assignee: FAURECIA Sièges d'Automobile, Nanterre (FR)

(*) Notice: Subject to any disclaimer, the term of this patent is extended or adjusted under 35 U.S.C. 154(b) by 168 days.

(21) Appl. No.: 17/940,540

(22) Filed: Sep. 8, 2022

(65) Prior Publication Data

US 2023/0071532 A1 Mar. 9, 2023

(30) Foreign Application Priority Data

Sep. 9, 2021 (FR) .................................. 2109447

(51) Int. Cl.
*B60N 2/00* (2006.01)
*B60N 2/56* (2006.01)
*G01D 5/24* (2006.01)

(52) U.S. Cl.
CPC ........... *B60N 2/002* (2013.01); *B60N 2/5678* (2013.01); *G01D 5/24* (2013.01)

(58) Field of Classification Search
CPC .... B60N 2/5685; B60N 2/5678; B60N 2/002; G01D 5/24
See application file for complete search history.

(56) References Cited

U.S. PATENT DOCUMENTS

| 5,896,090 A | 4/1999 | Okada | |
| 11,530,956 B2* | 12/2022 | Ferring | G01D 5/24 |
| 11,673,488 B2* | 6/2023 | Kawahira | H01H 3/141 |
| | | | 340/667 |
| 2007/0192007 A1 | 8/2007 | Stanley | |
| 2013/0127211 A1 | 5/2013 | Aoki | |
| 2014/0246887 A1* | 9/2014 | Clos | H01H 9/047 |
| | | | 297/217.3 |
| 2021/0146799 A1* | 5/2021 | Althaus | G01N 27/223 |

FOREIGN PATENT DOCUMENTS

| CN | 108068662 B | 1/2021 | |
| EP | 3178690 A1 * | 6/2017 | ............ B60N 2/002 |
| JP | 2011255743 A | 12/2011 | |
| WO | 2007047762 A3 | 4/2007 | |
| WO | 2019033060 A1 | 2/2019 | |

OTHER PUBLICATIONS

French Search Report for French App. No. 2109447 dated May 23, 2022, 35 pages, No English Translation Available.

* cited by examiner

*Primary Examiner* — Milton Nelson, Jr.
(74) *Attorney, Agent, or Firm* — Barnes & Thornburg LLP

(57) ABSTRACT

The present disclosure relates to an occupancy sensing device for detecting the occupancy of a seat of a vehicle, comprising: a flexible substrate having a first main face and a second main face opposite to the first main face, a capacitive sensor with interdigitated electrodes, capable of detecting the state of occupancy of the seat, conductive tracks connected to the capacitive sensor with interdigitated electrodes, the capacitive sensor with interdigitated electrodes and the conductive tracks being fixed on the first main face of the flexible substrate, wherein the flexible substrate is made of an elastic and impermeable material.

16 Claims, 4 Drawing Sheets

OCCUPANCY SENSING DEVICE, OCCUPANCY SENSING AND HEATING MAT, AND VEHICLE SEAT

PRIORITY CLAIM

This application claims priority to French Patent Application No. FR2109447, filed Sep. 9, 2021, which is expressly incorporated by reference herein.

BACKGROUND

The present disclosure relates to the field of comfort devices for vehicle seats. In particular, the present disclosure relates to an occupancy sensing device for a vehicle seat, an occupancy sensing and heating mat for a vehicle seat, and a vehicle seat.

SUMMARY

According to the present disclosure, an occupancy sensing device for detecting the occupancy of a seat of a vehicle, in particular of a motor vehicle, the device may comprise:
- a flexible substrate having a first main face and a second main face opposite to the first main face,
- at least one capacitive sensor with interdigitated electrodes, capable of detecting the state of occupancy of the seat,
- conductive tracks connected to the at least one capacitive sensor with interdigitated electrodes, the at least one capacitive sensor with interdigitated electrodes and the conductive tracks being fixed on the first main face of the flexible substrate,
- wherein the flexible substrate is made of an elastic and impermeable material.

The features set forth in the following paragraphs may optionally be implemented. They may be implemented independently of each other or in combination with each other:

The flexible substrate is made of a material among thermoplastic polyurethane, polydimethylsiloxane, polyvinyl alcohol, and silicone.

The flexible substrate is made of a material among polyethylene, poly(ethylene 2,6-naphthalenedicarboxylate), and polyimide, the flexible substrate having a thickness of less than 100 micrometers.

The at least one capacitive sensor with interdigitated electrodes is produced by electronic printing with stretchable ink.

The conductive tracks are produced by electronic printing with stretchable ink.

At least one conductive element, among the at least one capacitive sensor with interdigitated electrodes and the conductive tracks, is covered by a stretchable protective coating.

The device comprises at least one connection housing fixed to the conductive tracks by crimping or gluing then overmolding.

The flexible support comprises at least one longitudinal strip and at least one transverse strip extending perpendicularly to the at least one longitudinal strip, the at least one capacitive sensor with interdigitated electrodes being fixed to the at least one transverse strip, the conductive tracks being fixed to the at least one longitudinal strip.

The at least one longitudinal strip has a width comprised between 300 micrometers and 1 millimeter, and preferably comprised between 500 micrometers and 800 micrometers.

The at least one transverse strip has a width comprised between 10 millimeters and 50 millimeters, and preferably comprised between 20 millimeters and 40 millimeters.

In illustrative embodiments, an occupancy sensing and heating mat may comprise a sensing device according to the features mentioned above, and at least one heating element suitable for heating an occupant of the seat, the heating element being formed on the first main face of the flexible substrate by electronic printing with stretchable ink.

In illustrative embodiments, the occupancy sensing and heating mat comprises a sensing device according to the features mentioned above, and at least one heating element suitable for heating an occupant of the seat, the heating element being formed on the second main face of the substrate.

In illustrative embodiments, a vehicle seat, in particular of a motor vehicle, the seat may comprise a seating portion and a backrest hinged to the seating portion, the seating portion comprising a frame, a layer of foam carried by the frame, and at least one device among an occupancy sensing device according to the features mentioned above, and a heating and sensing mat according to the features mentioned above, the device being carried by the layer of foam.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
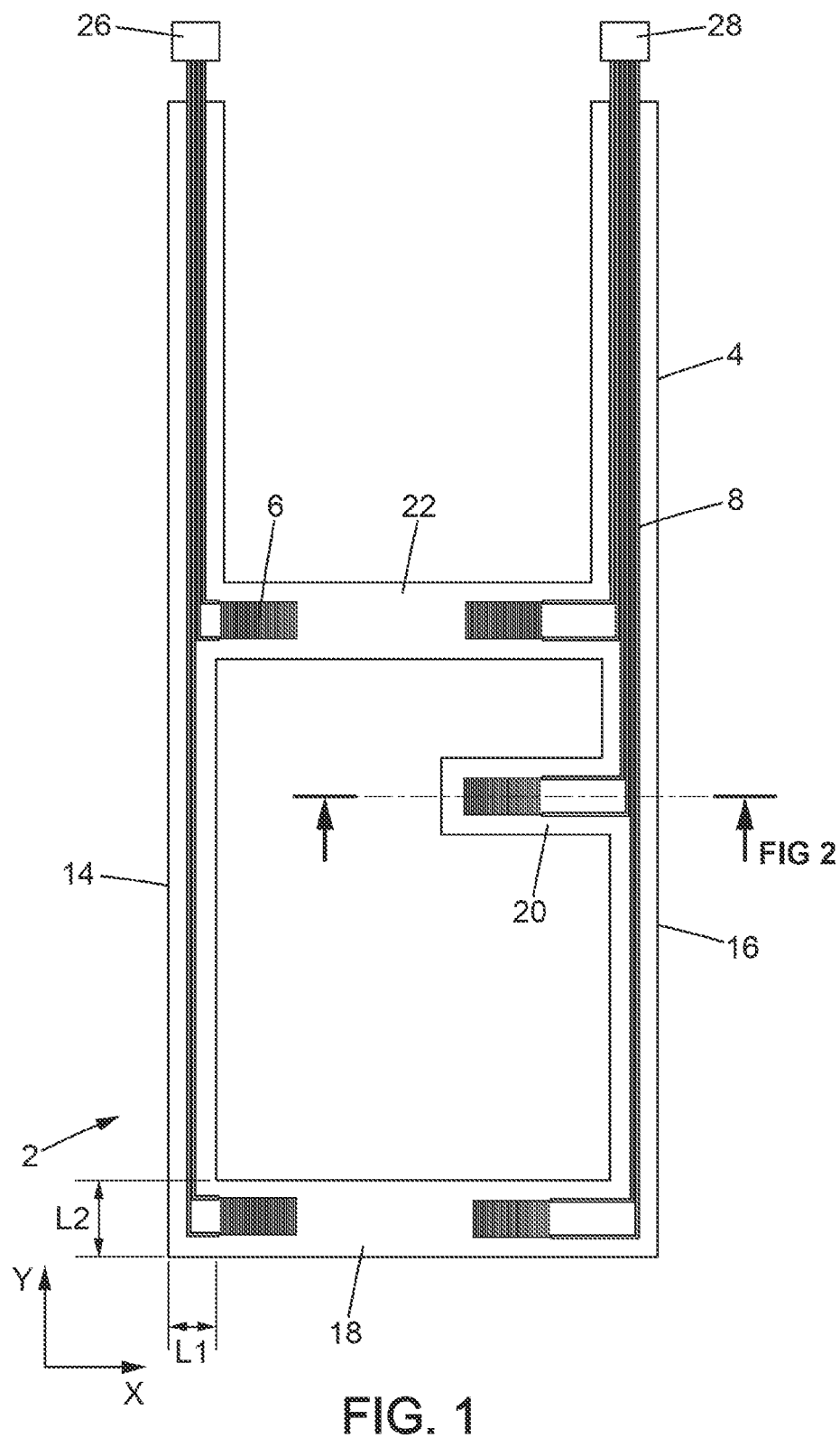
FIG. 1 is a diagram showing a top view of an occupancy sensing device according to the present disclosure.

In the following description, the terms "lower", "upper", "right", and "left" are understood according to when the sensing device of the present disclosure is arranged as illustrated in FIG. 1, and are in no way limiting.

The occupancy sensing device 2, 30, 39 and the heating and sensing mat 38 according to the present disclosure are intended for a vehicle, for example such as a motor vehicle, a train, an airplane, or a boat. In particular, they are suitable for a motor vehicle.

Figure 2:
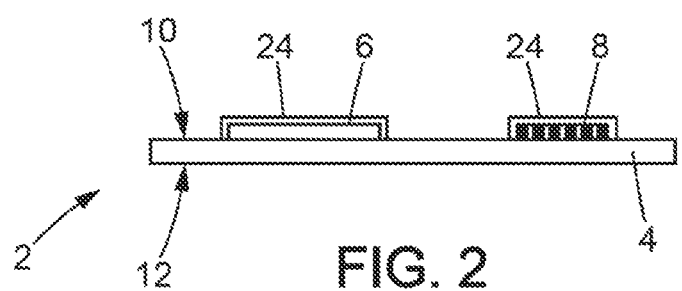
FIG. 2 is a diagram showing a section view of part of the occupancy sensing device shown in FIG. 1.

Referring to FIGS. 1 and 2, the occupancy sensing device 2 comprises a flexible substrate 4, five capacitive sensors with interdigitated electrodes 6 capable of detecting the state of occupancy of the seat, and conductive tracks 8 connected to the capacitive sensors with interdigitated electrodes 6.

The flexible substrate 4 has a first main face 10, and a second main face 12 opposite to the first main face.

The flexible substrate 4 is made of an impermeable and elastic material. Advantageously, the flexible substrate 4 is made of thermoplastic polyurethane. Advantageously, this material can perfectly follow the contours of curved shapes. It is able to adapt to more or less pressure applied to a more or less large surface.

Alternatively, the flexible substrate 4 is made of a first material among polydimethylsiloxane (referred to by the acronym PDMS), polyvinyl alcohol (referred to by the acronym PVA), and silicone.

According to another variant, the flexible substrate 4 is made of a second material among polyethylene (referred to by the acronym PE), poly(ethylene 2,6-naphthalenedicarboxylate) (referred to by the acronym PEN), and polyimide (referred to by the acronym PI). When the flexible substrate 4 is produced of this second material, the substrate has a thickness of less than 100 micrometers.

In the embodiment illustrated in FIG. 1, the flexible substrate 4 comprises two longitudinal strips 14, 16 extending parallel to each other in a longitudinal direction Y, and transverse strips 18, 20, 22 extending in a transverse direction X as can be seen in FIG. 1. The transverse direction X is perpendicular to the longitudinal direction Y. A first transverse strip 18 is arranged in the extension of the lower ends of the longitudinal strips 14, 16. A second transverse strip 22 is arranged substantially at mid-length of the longitudinal strips. The first transverse strip 18 and the second transverse strip 22 connect the longitudinal strips to each other. A third strip 20 is arranged at approximately ⅔ of the length of a longitudinal strip. This third strip 20 is only connected to one longitudinal strip 16.

Preferably, the longitudinal strips 14, 16 have a width L1 comprised between 300 micrometers and 1 millimeter, and preferably comprised between 500 micrometers and 800 micrometers.

Advantageously, these small widths facilitate attachment of the seat covering regardless of the material of this covering and the type of attachment.

Preferably, the transverse strips 18, 20, 22 have a width L2 comprised between 10 millimeters and 50 millimeters, and preferably comprised between 20 millimeters and 40 millimeters.

The capacitive sensors with interdigitated electrodes 6 are fixed on the first main face 10 of the flexible substrate. In particular, the capacitive sensors 6 are fixed on the transverse strips. In the embodiment shown in FIG. 1, two capacitive sensors 6 are fixed on the first transverse strip 18. Two other capacitive sensors 6 are fixed on the second transverse strip 22. A last capacitive sensor 6 is fixed on the third transverse strip 20.

The capacitive sensors each comprise two comb-shaped coplanar electrodes which are interlaced with one another. Each electrode is connected to a conductive track 8. One electrode is intended to be connected to a potential source of between 5 Volts and 12 Volts. The other electrode is connected to ground. The electrodes are not shown in detail in the figures.

Preferably, the capacitive sensors with interdigitated electrodes 6 are printed on the first main face 10 by electronic printing with stretchable ink. This electronic printing may be implemented for example by screen printing or by surface coating. A carbon nanotube ink may be used for example.

Advantageously, this type of ink is more resistant during stretching or bending of the flexible substrate. Such stretching or bending may be caused by an occasional depression of the seat foam, for example when a person places a knee on the seat in order to look for an object placed on the ground or on the back seat.

The capacitive sensors 6 may be covered with a stretchable protective coating 24, for example such as a stretchable lacquer or a stretchable dielectric material such as thermoplastic polyurethane (TPU), "DI 7548" or "DI 7540" marketed by the EMS company (registered trademark), "M316CL" marketed by the HENKEL company, or "CE 3103WLV" marketed by the HENKEL company.

The conductive tracks 8 are fixed on the first main face 10 of the flexible substrate. In particular, the conductive tracks 8 are fixed on the longitudinal strips 14, 16.

Preferably, the conductive tracks 8 are printed on the first main face 10 of the longitudinal strips of the flexible substrate, by electronic printing with a stretchable ink.

Advantageously, the conductive tracks 8 are printed simultaneously with the capacitive sensors 6 during a same printing operation. Preferably, the conductive tracks 8 are also covered with a stretchable protective coating 24.

The occupancy sensing device 2 for detecting the occupancy of a seat advantageously comprises two electrical connection housings 26, 28 each arranged at the upper end of a longitudinal strip 14, 16.

Advantageously, the electrical connection housings 26, 28 are crimped to the conductive tracks.

Alternatively, the electrical connection housings 26, 28 are glued with conductive glue, then overmolded with silicone or soft plastic.

The ends of the conductive tracks 10 connected to the capacitive sensors located on the left side of the sensing device are mounted in a first electrical connection housing 26. The ends of the conductive tracks 10 connected to the capacitive sensors located on the right side of the sensing device are mounted in the other electrical connection housing 28.

Advantageously, this type of attachment makes it possible to improve reliability of the mechanical retention of housings with conductive tracks formed on an elastic support. The electrical connection housings are thus fixed more securely.

Alternatively, the occupancy sensing device 2 comprises a different number of capacitive sensors with interdigitated electrodes, for example one, two, three, four, or six capacitive sensors with interdigitated electrodes.

Alternatively, the capacitive sensors with interdigitated electrodes are produced by stitching.

Alternatively, the conductive tracks are produced by stitching.

Figure 3:
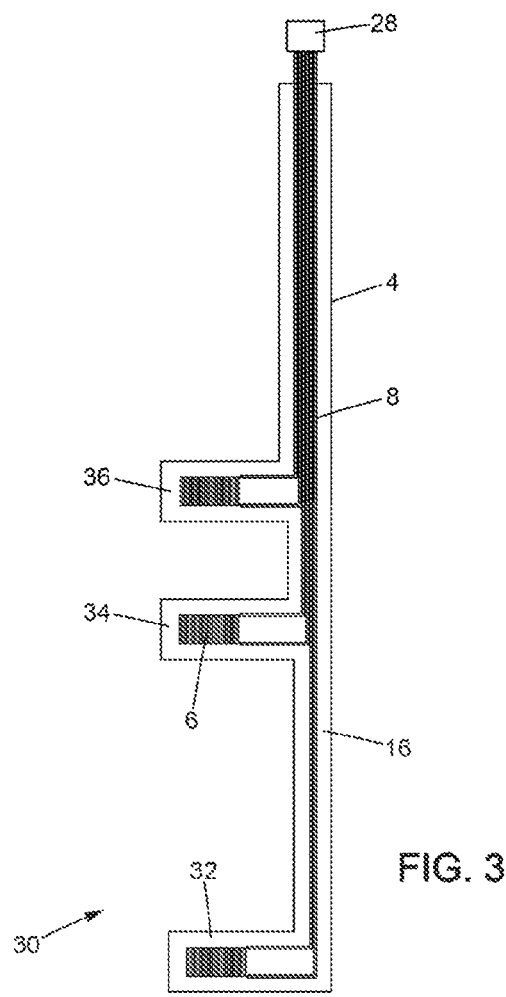
FIG. 3 is a diagram showing a top view of a variant of the occupancy sensing device shown in FIG. 1.

Referring to FIG. 3, the occupancy sensing device 30 according to an alternative embodiment comprises a single longitudinal strip 16 and three transverse strips 32, 34, 36 integrally secured to this longitudinal strip.

Figure 4:
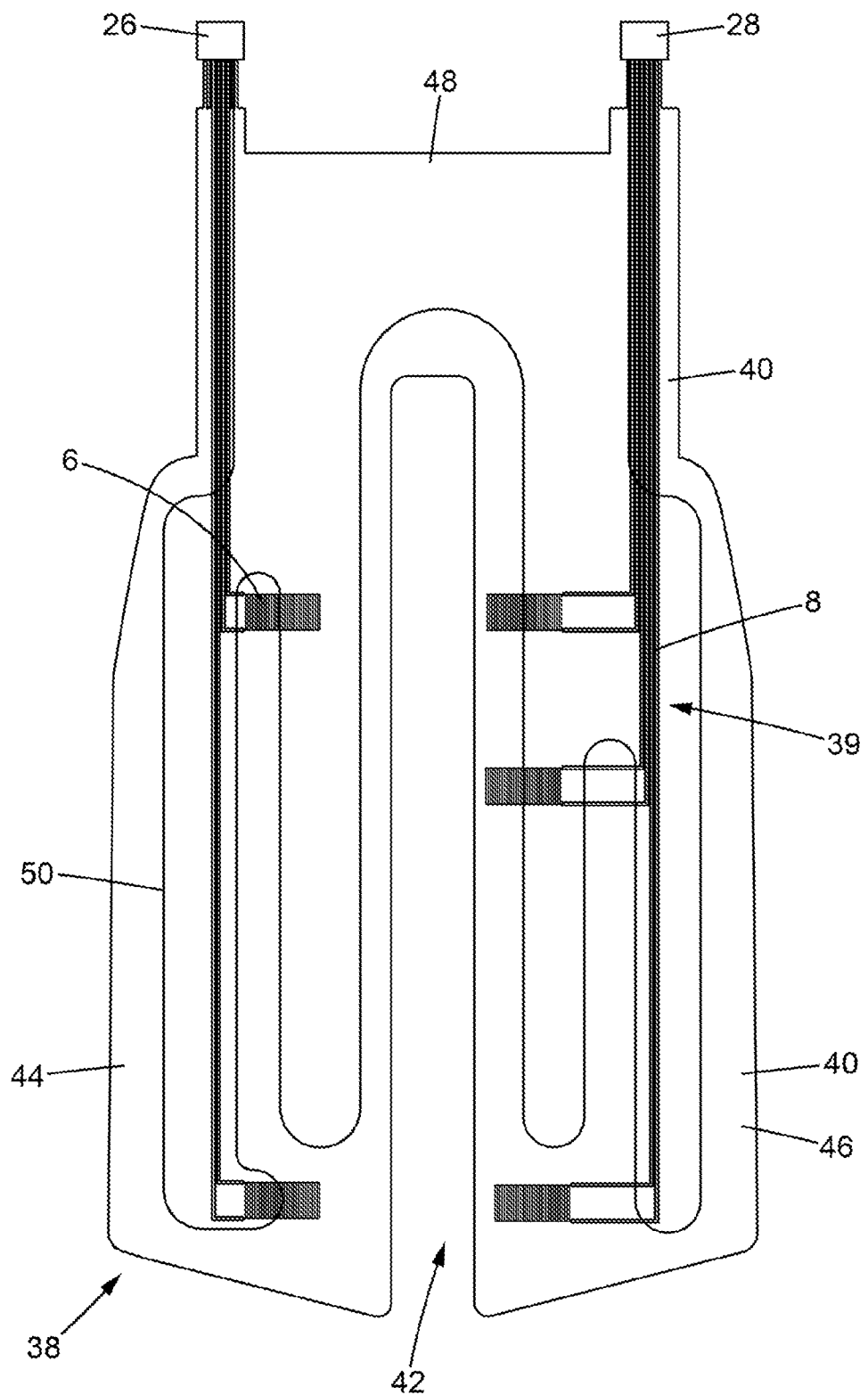
FIG. 4 is a diagram showing a top view of a heating and sensing mat according to the present disclosure.
Figure 5:
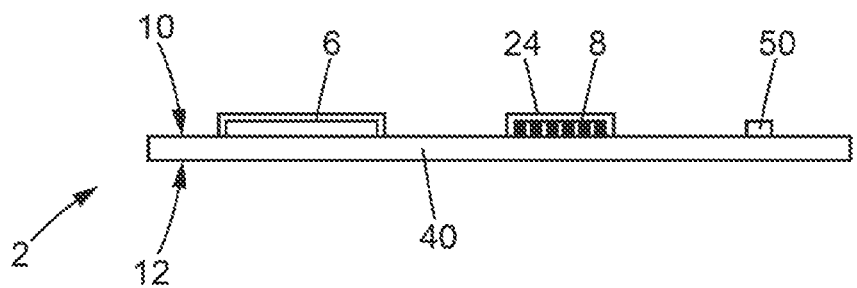
FIG. 5 is a diagram showing a section view of part of the heating and sensing mat shown in FIG. 4.

FIGS. 4 and 5 show an occupancy sensing and heating mat 38 comprising a sensing device 39 similar to the sensing device 2 described in relation to FIGS. 1 and 2, and a heating element 50 capable of heating an occupant of the seat.

The sensing device 39 comprises a flexible substrate 40, five capacitive sensors with interdigitated electrodes 6 capable of sensing the state of occupancy of the seat, and conductive tracks 8 connected to the capacitive sensors with interdigitated electrodes 6.

Flexible substrate 40 is substantially similar to flexible substrate 4 except that it does not have the same shape. It will not be described again in detail. Only its shape will be described.

The flexible substrate 40 has a rectangular shape provided with a central slot 42 defining two elongated panels 44, 46 spaced apart from each other and extending parallel to each other. The opening of the slot 42 is in the lower portion of the flexible substrate. The two panels are joined at the upper portion 48 of the flexible substrate. The two elongated panels are designed to extend one on either side of a pretensioner fixed in the center of the seat. The pretensioner is intended to flatten and hold the seat covering against the seat foam.

Alternatively, the flexible substrate 40 has a rectangular shape which is not provided with a central slot.

The capacitive sensors with interdigitated electrodes 6 and the conductive tracks are respectively identical to the capacitive sensors with interdigitated electrodes 6 and the conductive tracks 8 of the occupancy sensing device 2 illustrated in FIGS. 1 and 2. They will not be described again.

The sensing device 39 further comprises electrical connection housings 26, 28 identical to the connection housings 26, 28 of the occupancy sensing device 2 illustrated in FIGS. 1 and 2. These connection housings 26, 28 will not be described again.

The heating element 50 is suitable for heating an occupant of the seat. For this purpose, it traces for example a sinusoidal curve distributed over the entire surface of the substrate 40.

Preferably, the heating element 50 is printed by electronic printing with stretchable ink.

Preferably, the heating element 50 is printed at the same time as the capacitive sensors with interdigitated electrodes 6 and the conductive tracks 8, during a same printing operation.

Preferably, the heating element 50 is covered by a stretchable protective covering 24.

Each heating element 50 is provided with two electrical contacts arranged in the electrical connection housings 26, 28. The electrical contacts are intended to be connected to an electrical cable of a wiring harness of the seat, in order to supply them with electric current.

According to an embodiment not shown, the flexible substrate 40 of the mat is perforated to allow the passage of air from a ventilation system of the seat.

Alternatively, the mat 38 includes several heating elements 50.

According to another embodiment not shown, the mat 38 does not include a heating element 50 on the first main face 10, but one or more heating elements formed on the second main face 12 of the flexible substrate 40. In this embodiment, the heating elements 50 may be produced by electronic printing or by stitching with copper wire.

Finally, according to a last alternative, the mat 38 comprises at least one heating element 50 formed on the first main face 10 of the flexible substrate 40 and at least one heating element formed on the second main face 12 of the flexible substrate 40.

Figure 6:
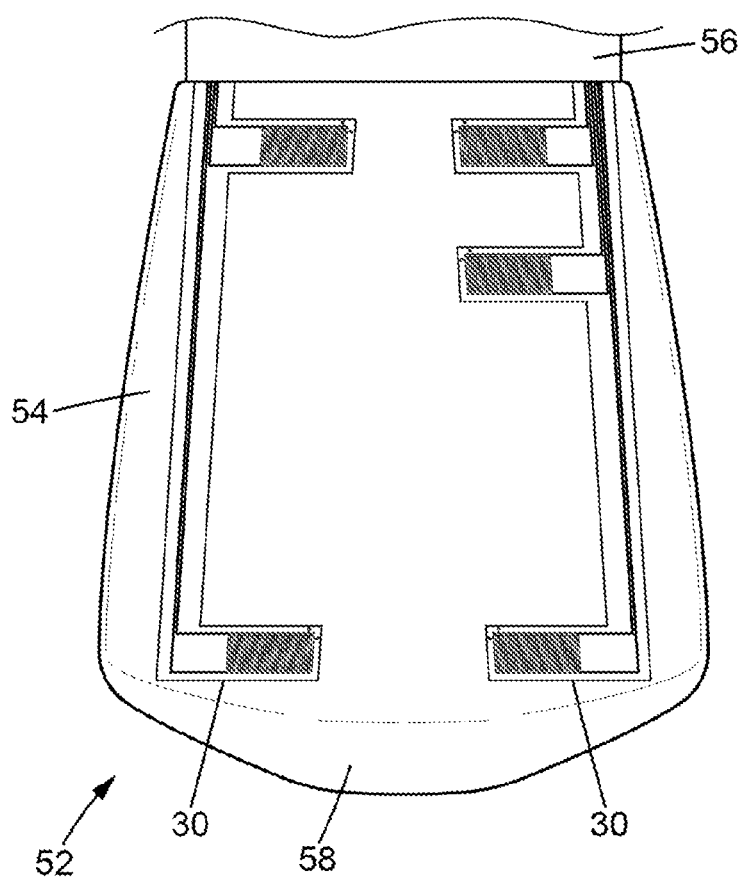
FIG. 6 is a diagram showing an example of a seat according to the present disclosure.

Referring to FIG. 6, the present disclosure also relates to a vehicle seat 52, in particular of a motor vehicle. The seat comprises a seating portion 54 and a backrest 56 hinged to the seating portion.

The seating portion comprises a frame, a layer of foam 58 carried by the frame, and an occupancy sensing device 30 as described in relation to FIG. 3. The second main face 12 of the flexible substrate is directly fixed, for example by gluing, to the foam layer of the seating portion.

According to an alternative not shown, the seat 52 comprises a sensing device 2 as described in relation to FIGS. 1 and 2.

According to another alternative not shown, the seat 52 comprises a heating and sensing mat as described in relation to FIGS. 4 and 5.

Finally, according to a last alternative not shown, the seat 52 comprises a heating and sensing mat having at least one heating element on the second main face 12.

The elastic material of the flexible substrate has a Young modulus comprised between 10 MPa and 5 000 MPa and preferably between 100 MPa and 2500 MPa.

There is a growing demand for occupancy sensing devices for detecting the occupancy of a vehicle seat, and in particular occupancy of a motor vehicle seat, whether this concerns a driver or a passenger. In particular, there is significant growth in this demand within the context of designing systems for sensing occupants of seats intended to be produced for the general public and based on the use of sensors integrated into these seats, in order to allow monitoring vehicle drivers and passengers. However, these comparative sensing devices have a short lifespan, so they should be changed several times during the life of the vehicle.

The present disclosure provides an occupancy sensing device capable of conforming to the shape of the seat's foam when the foam compresses or re-expands.

The present disclosure provides an occupancy sensing device capable of adapting to rounded surfaces or of entering grooves without damage to itself.

The present disclosure provides a more resistant occupancy sensing device.

The present disclosure provides an occupancy sensing device having a longer lifespan.

The present disclosure provides an occupancy sensing and heating mat which does not interfere with attachment of the seat covering.

The invention claimed is:

1. An occupancy sensing device for detecting the occupancy of a seat of a vehicle, in particular of a motor vehicle, the occupancy sensing device comprising:
   a flexible substrate having a first main face and a second main face opposite to the first main face,
   at least one capacitive sensor with interdigitated electrodes, capable of detecting a state of occupancy of the seat, and
   conductive tracks connected to the at least one capacitive sensor with interdigitated electrodes, the at least one capacitive sensor with interdigitated electrodes and the conductive tracks being fixed on the first main face of the flexible substrate,
   wherein the flexible substrate is made of an elastic and impermeable material.

2. The occupancy sensing device of claim 1, wherein the flexible substrate is at least one of thermoplastic polyurethane, polydimethylsiloxane, polyvinyl alcohol, and silicone.

3. The occupancy sensing device of claim 1, wherein the flexible substrate is at least one of polyethylene, poly (ethylene 2,6-naphthalenedicarboxylate), and polyimide, and the flexible substrate having a thickness of less than 100 micrometers.

4. The occupancy sensing device of claim 1, wherein the at least one capacitive sensor with interdigitated electrodes is produced by electronic printing with stretchable ink.

5. The occupancy sensing device of claim 1, wherein the conductive tracks are produced by electronic printing with stretchable ink.

6. The occupancy sensing device of claim 1, wherein at least one conductive element, among the at least one capacitive sensor with interdigitated electrodes and the conductive tracks, is covered by a stretchable protective covering.

7. The occupancy sensing device of claim 1, further comprising at least one connection housing fixed to the conductive tracks by crimping or gluing then overmolding.

8. The occupancy sensing device of claim 1, wherein the flexible support comprises at least one longitudinal strip and at least one transverse strip extending perpendicularly to the at least one longitudinal strip, the at least one capacitive sensor with interdigitated electrodes being fixed to the at least one transverse strip, the conductive tracks being fixed to the at least one longitudinal strip.

9. The occupancy sensing device of claim 8, wherein the at least one longitudinal strip has a width between 300 micrometers and 1 millimeter.

10. The occupancy sensing device of claim 8, wherein the at least one transverse strip has a width between 10 millimeters and 50 millimeters.

11. The occupancy sensing device of claim 8, wherein the at least one longitudinal strip has a width between 500 micrometers and 800 micrometers.

12. The occupancy sensing device of claim 8, wherein the at least one transverse strip has a width between 20 micrometers and 40 micrometers.

13. An occupancy sensing and heating mat comprising the occupancy sensing device of claim 1 and at least one heating element suitable for heating an occupant of the seat, the heating element being formed on the first main face of the flexible substrate by electronic printing with stretchable ink.

14. An occupancy sensing and heating mat comprising the occupancy sensing device of claim 1 and at least one heating element suitable for heating an occupant of the seat, the heating element being formed on the second main face of the substrate.

15. A vehicle seat, in particular of a motor vehicle, the vehicle seat comprising a seating portion and a backrest hinged to the seating portion, the seating portion comprising a frame, a layer of foam carried by the frame, and at least one device among the occupancy sensing device and the occupancy sensing and heating mat of claim 14.

16. The vehicle seat of claim 15, the at least one device being carried by the layer of foam.

* * * * *